United States Patent [19]
Tsukamoto

[11] Patent Number: 6,060,034
[45] Date of Patent: May 9, 2000

[54] ABATEMENT SYSTEM FOR CLF3 CONTAINING EXHAUST GASES

[75] Inventor: Toshiyuki Tsukamoto, Ushiku, Japan

[73] Assignee: L'Air Liquide, Societe Anonyme pour l'Etude et l'Exploitation des Procedes Georges Claude, Paris, France

[21] Appl. No.: 09/089,237

[22] Filed: Jun. 2, 1998

[51] Int. Cl.⁷ ................................................. B01D 53/34
[52] U.S. Cl. ...................................... 423/240 S; 423/241
[58] Field of Search .............................. 428/240 S, 241, 428/240 R

[56] References Cited

U.S. PATENT DOCUMENTS 5,094,825 3/1992 Mori ........................................ 423/241
5,378,444 1/1995 Akita et al. ........................... 423/240 S

FOREIGN PATENT DOCUMENTS

| 61-101231 | 5/1986 | Japan | 423/240 S |
| 62-152519 | 7/1987 | Japan | 423/240 S |
| 3-217217 | 9/1991 | Japan | 423/240 S |
| 4-94723 | 3/1992 | Japan | 423/240 S |
| 4-161224 | 6/1992 | Japan | 423/240 S |
| 4-7637 | 1/1994 | Japan | 423/240 S |

Primary Examiner—Ngoc-Yen Nguyen
Attorney, Agent, or Firm—Burns, Doane, Swecker & Mathis, L.L.P.

[57] ABSTRACT

A process for the abatement of a $ClF_x$ containing gas such as exhaust gases from a reactor wherein at least one step of the manufacture of integrated circuit is carried out, wherein the $ClF_x$ containing gas is passed through a bed of adsorbent comprising sodalime having a moisture content of less than 3% by weight, to substantially remove all of the $ClF_x$ compound from the $ClF_x$ containing gas with substantially no generation of byproducts.

8 Claims, 1 Drawing Sheet

ABATEMENT SYSTEM FOR CLF3 CONTAINING EXHAUST GASES

BACKGROUND OF THE INVENTION

1. Field of the Invention

The invention relates to an abatement system for $ClF_3$ containing exhaust gases. It relates more particularly to a process for the abatement of a $ClF_x$ containing gas such as an exhaust gas from a reactor.

2. Description of the Related Art $ClF_3$ gas has been widely used recently as a cleaning gas for the CVD reactors because of its high reactivity without the aid of a plasma or high thermal energy. However, the exhaust gas from the reactor after the cleaning of the same, contains various cleaning products and byproducts such as $ClF$, $ClF_2$, $HF$, $Cl_2$ in addition to $ClF_3$.

It is well known in the art to use sodalime to remove those toxic compounds from the exhaust gas of a CVD reactor by chemisorption.

It is also well known by the man skilled in the art to use zeolites to adsorb toxic compounds by physisorption from the exhaust gas flowing out of these CVD reactors. Also, scrubbing with an alkaline solution is a widely known method for abatement of toxic compounds in these exhaust gases.

However, the problem with these conventional methods is their inability to totally abate those toxic compounds. The reason is essentially because of their poor efficiency and the generation of secondary toxic compounds by the reaction between the exhausted components and the adsorbent material. Such byproducts include as referred to hereabove, $ClF$, $ClF_2$, $HF$ and $Cl_2$.

There is thus still a need for a system and method to substantially completely abate toxic compounds in the exhaust gases after cleaning a reactor with a $ClF_x$ gas or gas mixture.

SUMMARY OF THE INVENTION

According to the invention, it has been surprisingly found that the use of sodalime was exceptionally efficient in irreversibly remove any $ClF_x$ compound when it is dry which means when sodalime has a moisture content which is less than about 3% volume. In these conditions, substantially no generation of secondary products takes place as long as the temperature of the adsorbent (sodalime) is kept below substantially about 60° C. When the temperature of the dry sodalime is raised above 60° C., $Cl_2$ is generated by the reaction of dry sodalime and $ClF_3$, which $Cl_2$ cannot be efficiently removed by the dry sodalime.

However, when using dry sodalime alone, other products resulting from the cleaning process in the CVD machine such as $SiF_4$, $HF$ and $Cl_2$, cannot be removed totally with dry sodalime in an efficient way.

According to a preferred embodiment of the invention, the combination of dry sodalime and wet (or moist) sodalime, i.e. containing more than about 20% volume of moisture, can be used efficiently to remove all the $ClF_x$ products and any other byproducts from the exhaust gases of the CVD reactor after cleaning of such reactor with $ClF_x$. More preferably, the abatement system according to the invention comprises a two-layer cartridge comprising a bottom layer of dry sodalime and an upper layer of moist sodalime, moist sodalime having in addition to the above effect the capability of maintaining the dry sodalime at a temperature below 60° C. when the temperature of dry sodalime tends to increase due to the reaction of dry sodalime with byproducts. Most preferably the exhaust gas is diluted with an inert diluent gas such as nitrogen or any other well known inert gas including argon and other noble gases, which is helpful to avoid an increase of the temperature of dry sodalime above 60° C.

BRIEF DESCRIPTION OF THE DRAWING

The invention shall be better understood now with the following examples and the following figures wherein.

DETAILED DESCRIPTION OF THE PREFERRED EMBODIMENTS OF THE INVENTION

Figure 1:
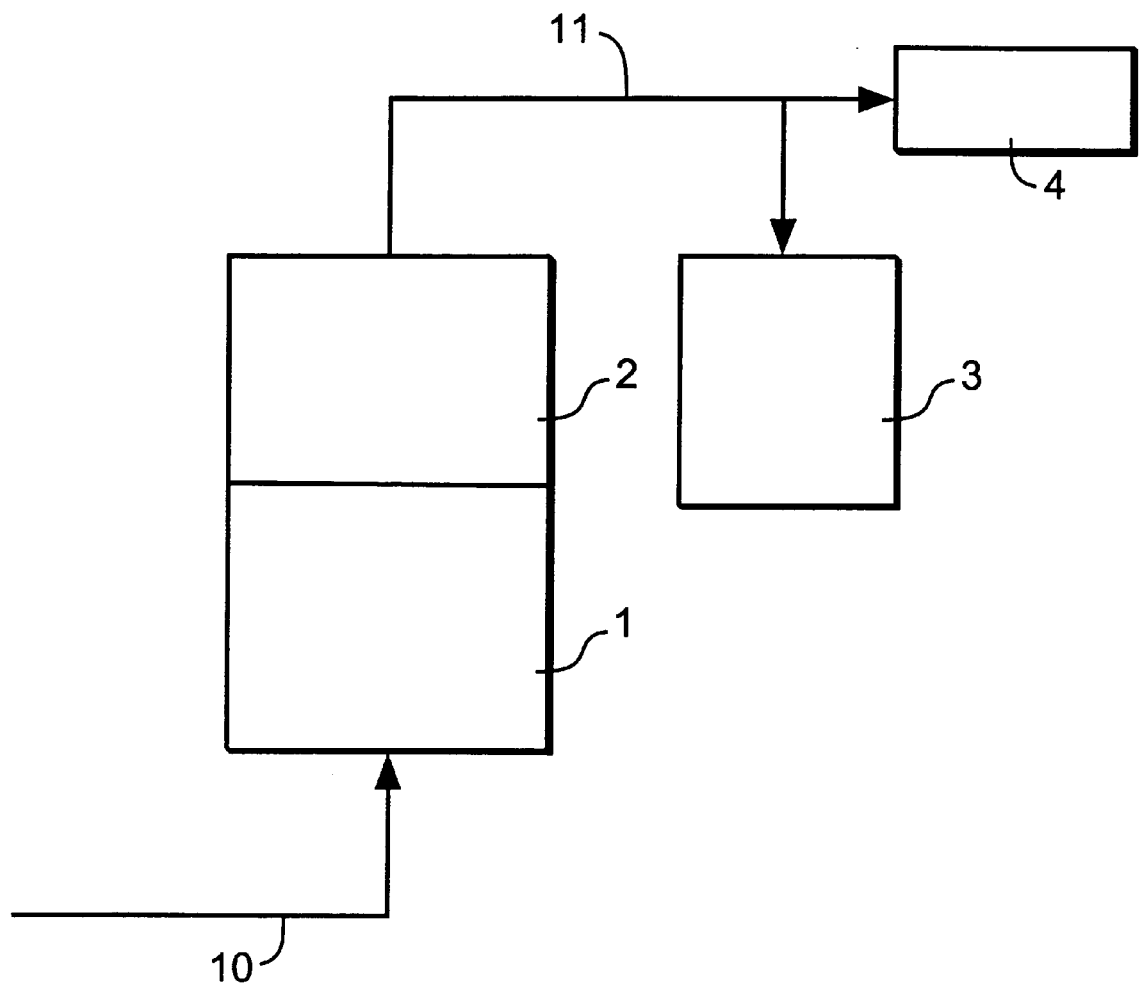
FIG. 1 shows an example of realization of the system according to the invention.

In FIG. 1, a gas mixture 10 of $ClF_3/N_2$ flowing out of a CVD reactor after cleaning of the same with ClF3 is sent to the dry sodalime bed 1 on top of which is placed the moist sodalime bed 2. After going through these two beds, the gas mixture 11 is sent to an analyzer/detector 3 for analyzing the composition of the gas after abatement and an adsorbent/scrubber 4 in order to remove and get rid of any of the remaining components before venting the substantially pure nitrogen.

EXAMPLE 1

Using a system as disclosed in FIG. 1, a cartridge containing 250 g each of dry sodalime 1 (<3% $H_2O$ content by baking) on the bottom and moist sodalime 2 (>20% $H_2O$ content) on the top. A gas mixture comprising 1% volume of $ClF_3$ in nitrogen was introduced into the system at velocity of 1 cm/sec. With the analyzer/detector (which consisted of a gas chromatograph) no toxic compounds were observed at the exit of this cartridge during 160 min which means a capacity of $ClF_3$ abatement of 17 cc/g on pure $ClF_3$ basis. A color indicator is placed on the moist sodalime (e.g. curcumin if detection of Cl2 is expected or D.740 for detection of HF) to detect when the cartridge is saturated (change of the color indicator which means that the cartridge must be changed).

EXAMPLE 2

Various tests have been conducted in the same conditions as in example 1, except that the relative proportions of dried sodalime to moist sodalime (1:1 in example 1) have been varied.

For example, with a ratio of 7:3 (350 g dry sodalime and 150 g moist sodalime), saturation of the cartridge occurred after about 105 min. With a ratio of 3:2 (350 g dry sodalime and 200 g moist sodalime), saturation occurred after 115 min.

It is thus preferred to have a ratio dry to moist sodalime which is less than 1.5, most preferably about 1 or less.

In these various cases however, the temperature of dry sodalime raises from about 20° C. to about 45° C. (for a ratio of 3/2 or less), while for a ratio of 7/3, the temperature stabilizes a little bit higher (about 55° C.).

By comparison, a combination of 250 g dry sodalime topped with 250 g of 13x molecular sieves was saturated (all other conditions similar to example 1) after 45 min.

In all the comparative examples, the total weight of the adsorbents was at least equal to 500 g.

EXAMPLE 3

As a comparison also, sodalime as commercially available comprises about 20% weight of $H_2O$. When $ClF_3$ flows through it, there is an immediate reaction of $H_2O$ and $ClF_3$ to generate HF.

When the sodalime adsorbent bed is dried according to the invention, i.e. comprising less than about 3% $H_2O$ weight (500 g), this dried sodalime bed was saturated (same gas mixture as in example 1) after 130 min, then $Cl_2$ was generated and the temperature (which was about 55° C. after the initial 130 mn) raises to about 65° C.

If $ClF_3$ is completely adsorbed by dry sodalime at low temperature, (below 60° C. preferably below 50° C.), this trapped $ClF_3$ may be released as $Cl_2$ when the temperature of the dry sodalime increases above about 50° C., preferably above about 40° C.

Without willing to be bound by any theory, the inventors believe that when the temperature is maintained below 40° C. in the two layers cartridge (dry sodalime on the bottom where the gas enters the cartridge and moist sodalime on the top of it), $ClF_3$ is first adsorbed on the dry sodalime irreversibly. When the dry sodalime is full with $ClF_3$, $ClF_3$ enters into the moist sodalime layer. When $ClF_3$ reacts with moist sodalime, it probably generates HF and $Cl_2$ (and maybe other Cl or F compounds, too), but $Cl_2$ (and other products) may be adsorbed in the moist sodalime better than HF. This is why HF comes out first and then $Cl_2$ follows later on. It may be inferred from the above that when HF breaks out first from the two-layers system, it means that $ClF_3$ completely saturated the dry layer and reached the moist layer. If $Cl_2$ breaks through first, it means that the temperature exceeded over the critical temperature before the dry layer is saturated.

What is claimed is:

1. A process for the abatement of a $ClF_x$ containing gas comprising the steps of:

(a) passing said $ClF_x$ containing gas through a bed of dry sodalime adsorbent to substantially remove all $ClF_x$ compounds from said $ClF_x$ containing gas with substantially no generation of byproducts, said bed of dry sodalime adsorbent having a moisture content of less than 3% by weight; and (b) passing the gas resulting from step (a) through a bed of wet sodalime adsorbent to substantially remove other toxic compounds from the gas resulting from step (a), wherein said bed of wet sodalime adsorbent is disposed next to said bed of dry soda lime adsorbent in order to cool the bed of dry sodalime adsorbent.

2. The process according to claim 1, wherein the temperature of the bed of dry sodalime adsorbent is kept below 60° C.

3. The process according to claim 2, wherein the temperature of the bed of dry sodalime is kept below about 50° C.

4. The process according to claim 1, wherein the $ClF_x$ containing gas is exhaust gas from a reactor wherein at least one step of a process for producing integrated circuits is performed.

5. The process according to claim 4, wherein the reactor is a CVD reactor.

6. The process of claim 1, wherein the toxic compounds are of a compound selected from the group consisting of HF, $SiH_4$, $Cl_2$, and combinations thereof.

7. The process according to claim 1, wherein the adsorbents are disposed in a cartridge, the bed of dry sodalime adsorbent disposed beneath the bed of wet sodalime adsorbent, wherein the $ClF_x$ containing gas is passed through the bed of dry sodalime adsorbent first and said bed of wet sodalime adsorbent thereafter.

8. The process according to claim 7, wherein the cartridge comprises at least one color indicator to indicate that at least one of the adsorbents is saturated.

* * * * *